(12) United States Patent
Crasnianski et al.

(10) Patent No.: US 9,366,944 B2
(45) Date of Patent: Jun. 14, 2016

(54) INSTALLATION FOR THE ACQUISITION OF PHOTOGRAPHIC PORTRAITS

(71) Applicant: PHOTO-ME INTERNATIONAL PLC, Surrey (GB)

(72) Inventors: Serge Crasnianski, Geneva (CH); Christian Croll, Claix (FR)

(73) Assignee: Photo-Me International PLC, Bookham Surrey (GB)

( * ) Notice: Subject to any disclaimer, the term of this patent is extended or adjusted under 35 U.S.C. 154(b) by 0 days.

(21) Appl. No.: 14/499,798

(22) Filed: Sep. 29, 2014

(65) Prior Publication Data

US 2015/0104162 A1   Apr. 16, 2015

(30) Foreign Application Priority Data

Oct. 14, 2013   (EP) ..................................... 13306405

(51) Int. Cl.
| | | |
|---|---|---|
| *G03B 15/02* | (2006.01) | |
| *G03B 15/07* | (2006.01) | |
| *G03B 17/53* | (2006.01) | |

(52) U.S. Cl.
CPC ................ *G03B 15/07* (2013.01); *G03B 17/53* (2013.01)

(58) Field of Classification Search
CPC ........ G03B 15/00; G03B 15/02; G03B 15/03; G03B 15/035; G03B 15/05; G03B 15/06; G03B 15/07
USPC ........................................................ 396/2, 4
See application file for complete search history.

(56) References Cited

U.S. PATENT DOCUMENTS

| | | | |
|---|---|---|---|
| 1,794,142 A | | 2/1931 | Boston |
| 2,749,429 A | * | 6/1956 | Wavell ...................... E04H 1/14 250/214 AL |
| 3,864,708 A | | 2/1975 | Allen |
| 4,688,105 A | * | 8/1987 | Bloch et al. .................... 386/224 |
| 5,117,283 A | | 5/1992 | Kroos et al. |
| 5,589,902 A | | 12/1996 | Gruel et al. |
| 2003/0152376 A1 | * | 8/2003 | Maeda et al. ...................... 396/2 |
| 2006/0133654 A1 | * | 6/2006 | Nakanishi .............. G03B 17/53 382/118 |
| 2011/0317394 A1 | * | 12/2011 | Van Campen ......... G03B 15/06 362/16 |

FOREIGN PATENT DOCUMENTS

| | | | |
|---|---|---|---|
| FR | 2 689 355 A1 | 10/1993 | |
| WO | 94/26057 A1 | 11/1994 | |

OTHER PUBLICATIONS

European Search Report (Application No. 13306405.5) dated Jan. 9, 2014.

* cited by examiner

*Primary Examiner* — Clayton E Laballe
*Assistant Examiner* — Fang-Chi Chang
(74) *Attorney, Agent, or Firm* — Burr & Brown, PLLC

(57) ABSTRACT

An installation for the acquisition of photographic portraits formed of a booth delimiting an inner space, including: a first wall delimiting a portion of the inner space of the booth, at least a portion of the first wall being transparent; a photographic apparatus or camera arranged behind a transparent or semi-transparent portion of the first wall, said device comprising a field of view directed towards the inside of the booth and having its focal plane located inside of the booth; at least one light-emitting device arranged behind a transparent portion of the first wall, capable of illuminating the inside of the booth. It comprises an additional light-emitting device, comprising at least two light-emitting surfaces, illuminating the inside of the booth and respectively arranged on a second and a third walls facing each other and delimiting the inner space of the booth.

8 Claims, 5 Drawing Sheets

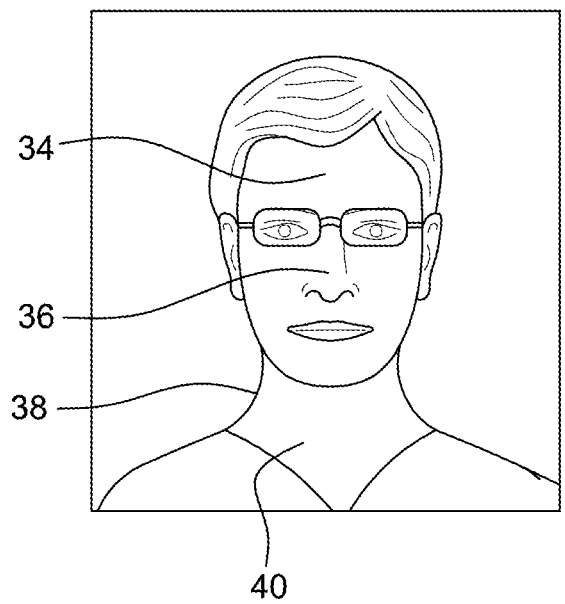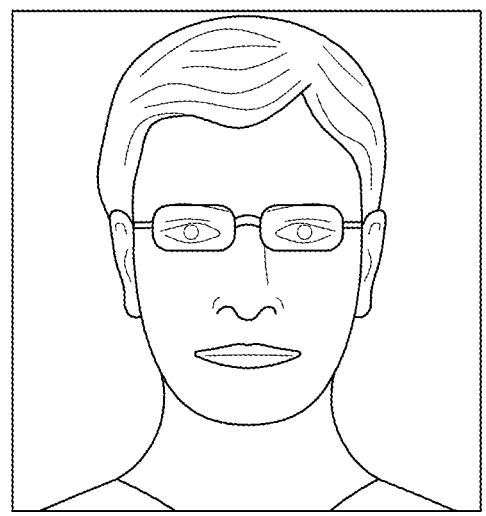
Fig. 2A  Fig. 2B

US 9,366,944 B2

1

INSTALLATION FOR THE ACQUISITION OF PHOTOGRAPHIC PORTRAITS

FIELD OF THE INVENTION

The present invention relates to the technical field of devices or apparatuses enabling to take photographs.

More particularly, the invention relates to an installation for the acquisition of photographic portraits, also called "photomaton" in France (photo booth), taking photographic shots and instantly developing the photographs, particularly for identity papers or the like.

BACKGROUND OF THE INVENTION

An installation 2 of the considered type such as illustrated in FIG. 1 comprises a booth 4 delimited by four walls 6, 8, 10, and 12, and a ceiling. A photographic apparatus or camera 14 is placed behind a first wall 6, at the level of a transparent portion of said wall, so that its field of view 16 is directed towards the inside of booth 4 and its focal plane 18 is present inside of said booth.

A second lateral wall 8 of the booth comprises an opening to enable a user 20 to enter into said booth. A seat 22 placed in front of photographic apparatus 14 and close to its focal plane 18 enables the user to sit at a proper distance from the device to have a clear photographic portrait.

Visual marks located at the level of the device help the user place his/her face according to a reference position 24, so that the portrait of his/her face 26 is face-on and centered on the photograph to be taken. The reference position is an area located at the intersection of focal plane 18 and the center of the field of view 14 of the photographic apparatus.

When photographs are taken, a first light source 28 and a second light source 30 placed behind transparent portions of first wall 6 illuminate face 26 of the user. The first and second light sources are respectively placed above and under the photographic apparatus. They are directed and calibrated to illuminate the user's face in reference position 24, in order to decrease contrast areas at the level of his/her face on the photographs.

The first and second light sources illuminate along directions 32 having significant angles of incidence on the user's face, respectively high and low angles. The light sources are directed to complementary illuminate the different reliefs of the user's face and calibrated to illuminate the reference position with the same intensity. More specifically, the shadows formed by the light originating from one of the light sources are illuminated by the light originating from the other light source. Thus, the entire face is illuminated to limit the contrast of the face on the photograph.

However, a poor positioning of the user's face, that is, a positioning slightly offset from reference position 24, may cause an overexposure of certain portions of his/her face with respect to others. According to the morphology and to the position of the face, shadows may then form and no longer be sufficiently illuminated by the other light source. High-contrast areas then appear on the photograph, which is not desirable. For example, as illustrated in FIG. 2A, too high a positioning of the face with respect to the optical axis of the photographic apparatus and a slight inclination of the top of the face towards the first wall favor an overexposure by the first light source of prominent areas of the face, such as forehead 34, nose 36, and chin 38. Such prominent areas form shadows, such as for example chin 38 or a shirt at the level of neck 40, which are illuminated with less intensity since they are located at a greater distance from the second light source

2 with respect to the reference position. The user's photographic portrait then comprises high-contrast areas, capable of masking certain portions of his/her face. The photographic portrait is then incomplete and is likely not to fulfill the requirements for forming a passport or any other official documents. In other words, the photographic portraits may be unusable.

Further, these two light sources at the front have other disadvantages: one can indeed observe an erasing of the relief of the face, which then seems pale, an enhancing of the shine in the presence of stronger sweating of certain portions of the face (particularly on the large planar surfaces of the face such as the forehead).

To partly overcome these disadvantages, it is known to provide another light source, located at the level of wall 12, that is, positioned behind the user. Such a light source is intended to suppress the shadows cast on the background of the booth, and to provide a homogeneous light grey all over the background, by saturation of the photographic apparatus or camera.

To decrease the contrast, a solution may comprise increasing the sensitivity of the sensor or of the film of the photographic apparatus. Unfortunately, the noise of the photograph then increases proportionally, which translates as a decrease in its quality. Further, the sensitivity increase increases the intensity of the most exposed areas, which may then be overexposed. White tinted areas adversely affecting the quality of the photograph may thus appear.

Another solution may also comprise increasing the intensity of the light illuminating the user. Here again, this is not ideal since too high a light intensity causes a discomfort for the user, diminishes the color rendering by overexposing his/her face, and darkens the background. Photographs where the user's face is pale are then obtained.

The Applicant provides an installation for the acquisition of photographic portraits taking high-quality photographs, including when the user's position is approximate in front of the photographic apparatus of said machine.

SUMMARY OF THE INVENTION

The present invention relates to an installation for the acquisition of photographic portraits, enabling to illuminate in substantially homogeneous fashion a user's face, when he/she is not accurately positioned according to the reference position of said installation.

For this purpose, the installation of the invention comprises a booth defining an inner space delimited by a first wall, having at least one transparent or semi-transparent portion to enable a photographic apparatus or camera arranged behind said portion to have a field of view directed towards the inside of the booth. The installation comprises at least one light-emitting device arranged behind said transparent portion of the first wall, and capable of illuminating the inside of the booth.

According to the invention, the installation also comprises a second light-emitting device, comprising at least two light-emitting surfaces illuminating the inside of the booth. The light-emitting surfaces are respectively arranged at the level of a second and of a third walls of the booth, facing each other and delimiting the inner space of the booth. The light-emitting surfaces are arranged:

to the left and to the right of the photographic apparatus or camera; and between the first wall and the focal plane of the photographic apparatus or camera;

and, outside of the field of view of said device.

The layout of the light-emitting surfaces according to the invention thus enables to illuminate a portion of the focal plan of the photographic apparatus, located in the field of view of the device, according to different angles relative to the first light-emitting device. More specifically, the emitting surfaces enable to illuminate the sides of the user's face in the booth, to illuminate the areas underexposed by said first light-emitting device. This second light-emitting device does not directly illuminate the field of view of the device, but illuminates it by multiple diffuse reflections on the reflective surfaces of the booth, and particularly the second and third walls delimiting said booth with the ceiling.

The second light-emitting device is much brighter than the first device, and the first light-emitting device sees its luminosity attenuated, which provides:
- in the end, a decrease of the user's dazzling;
- less reflection on the preponderating portions of the user's face;
- less reflection on eyeglasses capable of being worn by the user, even if they have surfaces of variable curvature (concave or convex);
- a better homogeneity of the background, since the user casts less shadow on the background.

The general luminosity increase provided by the second light source also enables to improve the signal-to-noise ratio of the sensor of the photographic apparatus or camera.

Thereby, the illumination of the user's face is more homogeneous since it is achieved by a larger number of light sources which are more homogeneously distributed around his/her face. The face contrasts are thus attenuated, and high-quality photographs are thus obtained, including when the user's face is not positioned according to the reference position of the installation. Further, the booth being bathed in an additional homogeneous light, it is possible to decrease the sensitivity of the photographic apparatus and/or the intensity of the first light-emitting device.

The field of view and the focal plane of the photographic apparatus delimit a first area, excluding a second area of the booth. Advantageously, the second light-emitting device comprises a first and a second reflective surfaces, respectively arranged on a second and a third wall delimiting the booth, in the case in point to the left and to the right of the user.

The reflective surfaces are illuminated by a light source arranged between the second and the third wall. Thereby, a light-emitting surface of large dimension capable of promoting the homogeneity of the illumination is obtained.

The light source preferably comprises an optical cache arranged so that the light source only illuminates the second area of the booth, to avoid an overexposure of the upper portion of the user's face and a dazzling of the photographic apparatus.

Preferably, a surface of the optical cache opposite the light-emitting source may be reflective to enable the light to reflect towards the second area of the booth. The fifth surface or ceiling located above the user also has a reflective and diffusing nature, to homogeneously illuminate the top of the user's face.

The second light-emitting device comprises an optical cache arranged between the light source and each wall supporting the reflective surfaces, to limit the value of the angle of dispersion of the light illuminating said walls, to a value smaller than approximately 90 degrees and to avoid illuminating the first area of the booth (at the reference position level).

Preferably, the caches delimit the reflective surfaces at the level of the field of view of the photographic apparatus or of the camera to allow an optimal indirect illumination of the sides of the user's face. Such surfaces are strongly reflective but also provide a diffusing reflection.

To allow a more local illumination of each reflective surface, the light source may comprise two lighting elements, each lighting element respectively illuminating the second and the third walls of the booth. Each lighting element may have an elongated shape and may comprise an axis of larger dimension substantially parallel to the second and/or third wall of the booth. Due to the diffusing properties of such reflective surfaces, these same surfaces behave as large light sources uniformly illuminating the entire user's face of variable sizes and positions.

The inclination angle of the two lighting elements with respect to the fifth surface (ceiling) as well as the position of the shadow cone introduced by the optical cache associated therewith should be optimized according to:
- the user's centering relative to the booth,
- the distance between the user and the second wall;
- the distance between the user and the third wall;
- the distance between the user and the second light-emitting device;
- and the reflective properties of the second and third walls.

Such an optimization is intended to create a homogeneity of the illumination between the left-hand and right-hand lateral portions of the face. The angles of the two lighting elements have values optimized around 30 degrees.

The installation of the invention may comprise an at least partly transparent fourth wall delimiting the inner space of the booth. The fourth wall is positioned opposite the first wall. It is also provided with a light-emitting device capable of illuminating the inside of the booth. Such an emission device may change color and luminosity at will to modify the background of photographs. Preferably, such a light-emitting device is comprised of three red, blue, and green light sources.

To optimize the homogeneity of the colored background on photographs, the fourth wall may comprise an additional light diffusion layer, which may also be provided with antireflection properties to avoid reflecting the light originating from the inside of the booth. This layer may cover the surface of the fourth wall opposite the user. It may also be a layer absorbing the light originating from the inside of the booth.

In order for the colored background to be able to generate a better color saturation, a layer of dark neutral color may limit the reflection of light originating from the inside of the booth.

For example, an absorbing dark color of mat type may cover a surface of the fourth wall opposite the inside of the booth.

Preferably, said layer of dark neutral color is also semi-transparent to enable the emission device to illuminate the inside of the booth.

The installation of the invention may comprise means enabling to control the light intensity and/or the color of at least one of said above-mentioned light-emitting devices, to enable to adapt said light-emitting devices to different booth configurations and to the reflection properties of the materials covering the walls delimiting said booth. Possibly, to allow a better adaptability of light-emitting devices to different booth layouts, they may be autonomously calibrated.

BRIEF DESCRIPTION OF THE DRAWINGS

The present invention will be better understood on reading of the following description provided as a non-limiting indicative example only in relation with the accompanying drawings, where the same reference numerals designate the same or the like elements, among which:

FIG. 2A shows a photographic portrait of a user taken by a machine according to FIG. 1, such as previously discussed;

FIG. 2B shows a photographic portrait of a user taken by an installation according to the invention;

DETAILED DESCRIPTION OF THE INVENTION

Figure 1:
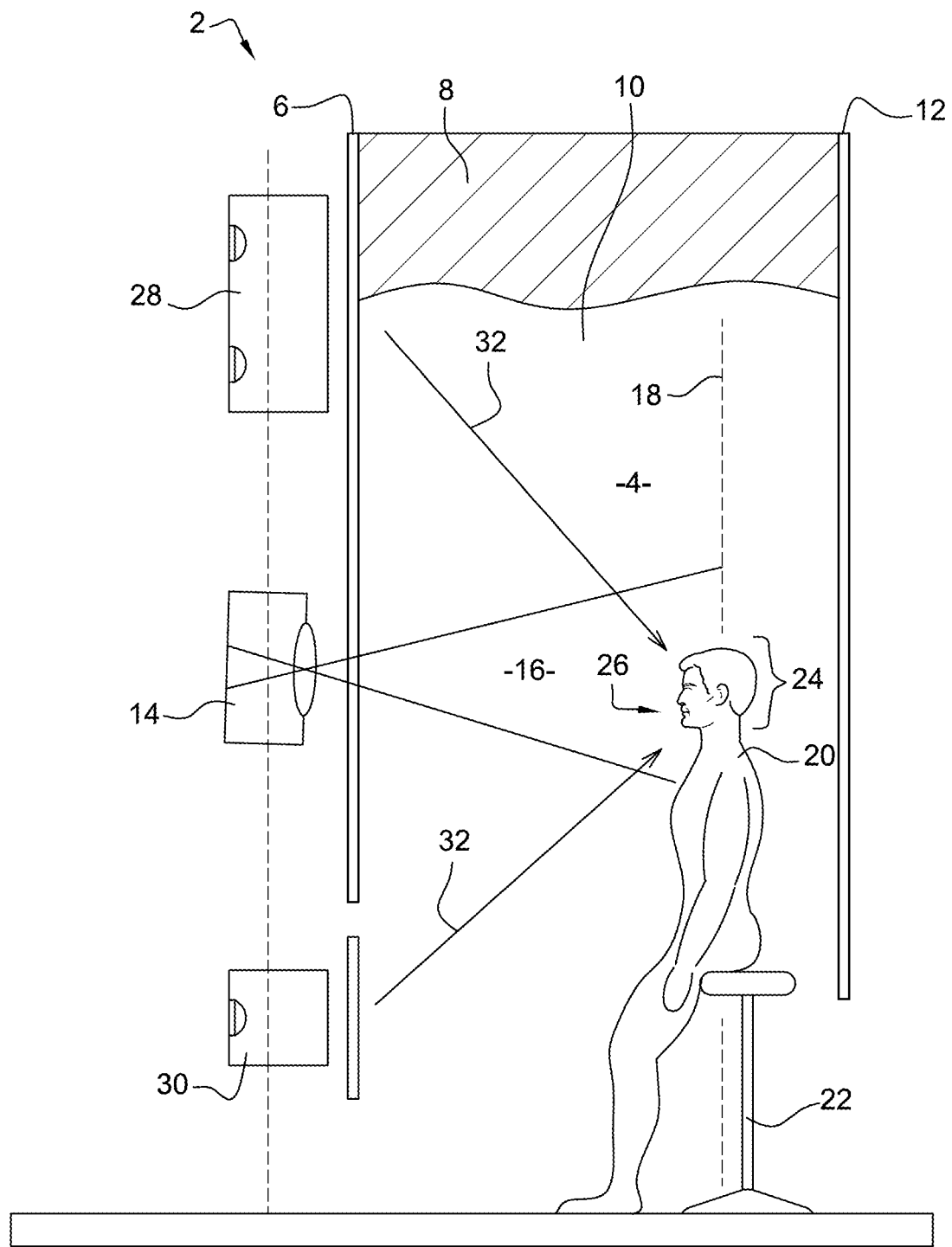
FIG. 1 is a simplified view of a cross section of a known photographic portrait acquisition installation of the state of the art such as described hereabove.
Figure 3:
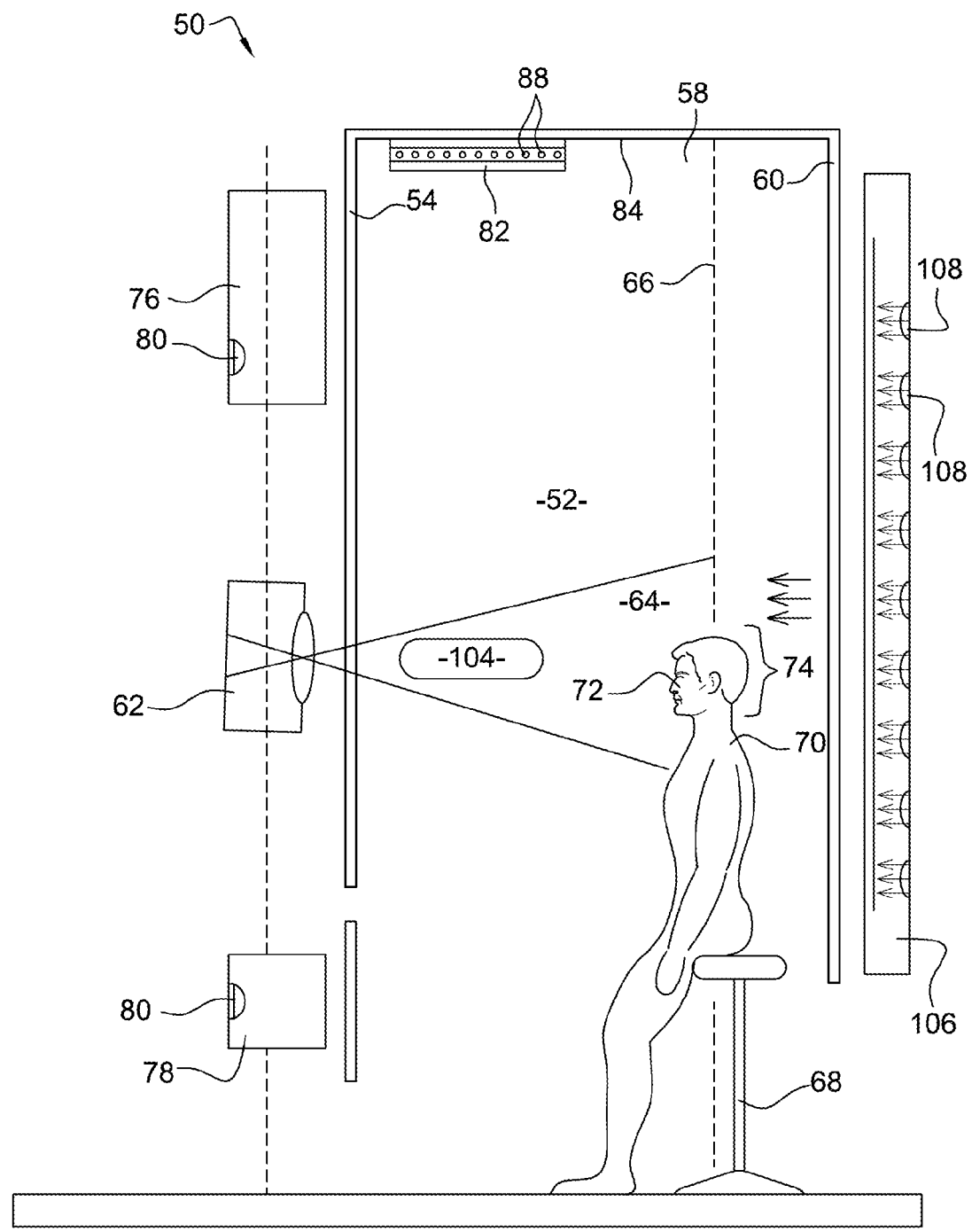
FIG. 3 is a simplified view of a transverse cross-section of an embodiment of a photographic portrait acquisition installation according to the invention.

FIG. 3 illustrates an embodiment of a photographic portrait acquisition installation 50 according to the invention. It comprises a booth 52 delimited by four walls 54, 56, 58, and 60, and a ceiling 84.

A first wall 54 comprises transparent portions to enable a photographic apparatus 62 positioned behind said wall to have its field of view 64 and its focal place 66 inside of the booth. The photographic apparatus may be of silver film type, or preferably of digital type. It may also be replaced with a camera.

A seat 68 is present in the booth to enable a user 70 to sit in front and close to focal plane 66 of the photographic apparatus. More specifically, the seat is placed to comprise the focal plane of said photographic apparatus. An adjustment device enables the user to adjust the position of the seat to place his/her face 72 in a reference position 74. The reference position is centered in the plane defined by the intersection of field of view 64 and the focal plane 66 of the photographic apparatus.

Installation 50 comprises means enabling the user to position his/her face in the reference position. Such means may be visual indications located in front of the photographic apparatus, such as for example a mark to position his/her eyes at the right height in the field of view of the photographic apparatus.

A first light-emitting device 76 is arranged behind a neutral semi-transparent diffusing portion of first wall 54 and above photographic apparatus 62. A second similar light-emitting device 78 is also arranged behind a neutral semi-transparent diffusing portion of the first wall, but under said device. The first and second light-emitting devices each comprise one or a plurality of light sources, emitting light having a color rendering index typically greater than 75, with a temperature in the range from 3,500 K to 4,500 K, an intensity in the range from 60 to 200 Lumens for the upper device, and an intensity in the range from 150 to 300 Lumens for the base device, and a diffusion angle in the range from 110° to 130° before diffusion.

A computer information display 87, located between photographic apparatus 62 and second light-emitting device 78 also takes part in the illumination of the face, typically up to approximately 5% of all the light sources. According to the layout of the display and to its intensity, this light source may possibly totally replace second light-emitting device 78, which would then amount to approximately 20% of all the light sources.

According to the embodiment of the invention illustrated in FIG. 3, the first and second light-emitting devices 76, 78 each comprise two LEDs 80, emitting warm white light characterized by a color rendering index equal to 80, a temperature of 4,000 Kelvins, a native intensity of 560 Lumens, and a diffusion angle of 120°. To balance the part of the two light sources 76 and 78, an electronic software mechanism enables to independently attenuate the controlled intensity of each of LEDs 80.

Light-emitting devices 76 and 78 are directed and calibrated to illuminate reference position 74 by respective approximate proportions in the range from 20% to 15% of all the light sources. As indicated hereabove and illustrated in FIG. 2A, when the user approximately positions his/her face 72 relative to reference position 74, white areas and dark areas may appear at the level of his/her face on the photograph. Such areas form due to a non-homogeneous illumination of his/her face by the first and second light-emitting devices.

To limit this phenomenon, the installation of the invention comprises a light-emitting source 82 positioned between focal plane 66 of photographic apparatus 62 and first wall 54 of the booth. To avoid this light-emitting source from casting a shadow on the user's face, it is positioned above first light-emitting device 76. According to the present example, it is attached to ceiling 84 of the booth by appropriate means. As a variation, such an additional light-emitting source may be positioned under the second emission device.

Figure 4:
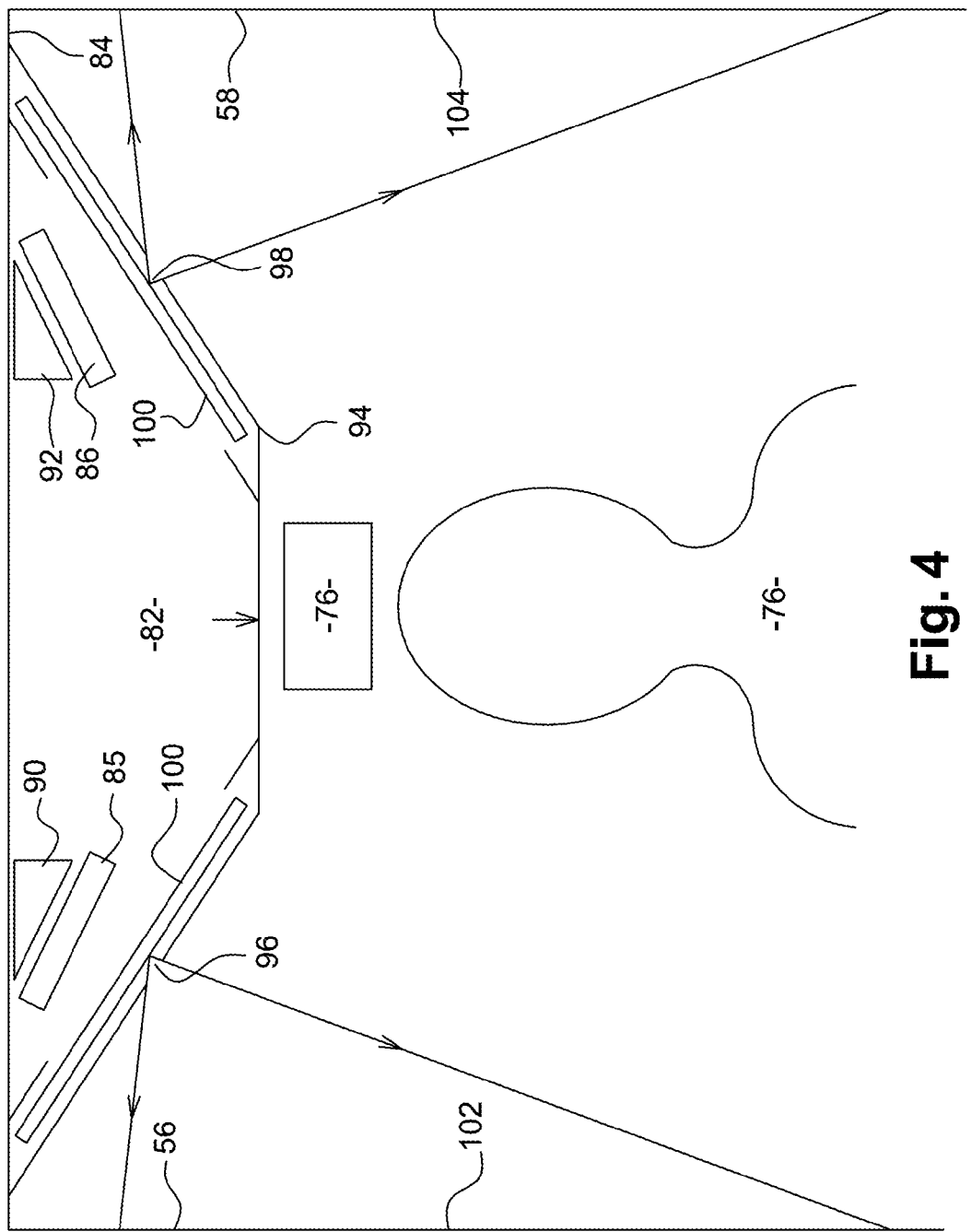
FIG. 4 is a partial simplified view of a longitudinal cross-section along axis (AA') of the installation of FIG. 3.
Figure 5:
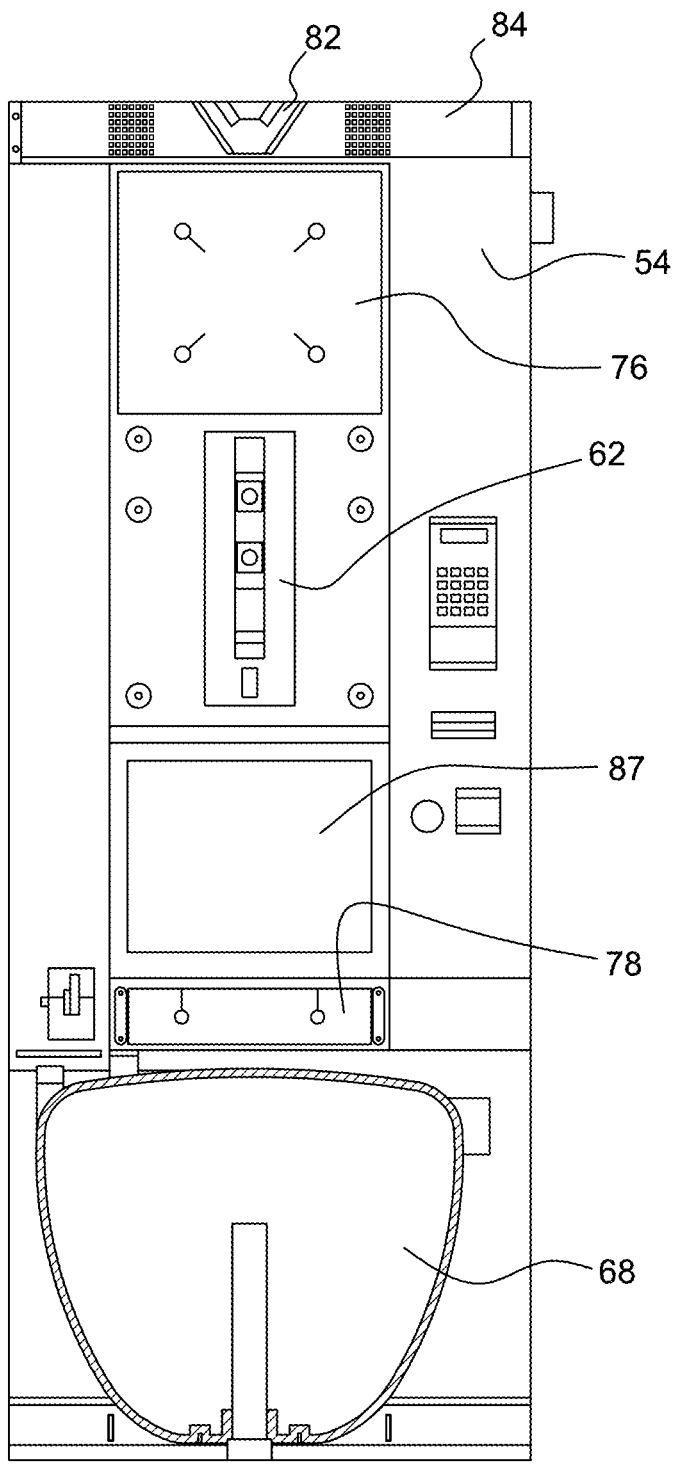
FIG. 5 is a simplified cross-section view of the booth of the installation of the invention.

As illustrated in FIG. 4, light-emitting source 82 comprises a first and a second lighting elements. More specifically, a first lighting element 85 is arranged to illuminate second wall 56 delimiting the booth and adjacent to said first wall 54, and a second lighting element 86 is positioned to illuminate third wall 58 of said booth, facing second wall 56. The second and third walls are thus positioned opposite each other, and secant to first wall 54.

Said lighting elements may each emit warm white light having a color rendering index greater than 80, with a temperature in the range from 3,500 to 4,500 Kelvins, an intensity in the range from 500 to 650 Lumens, and a diffusion angle in the range from 20° to 40°.

According to the example illustrated in FIGS. 3 and 4, the first and the second lighting elements comprise an alignment of LEDs 88 maintained and directed opposite to lateral walls 56, 58 of the booth respectively via a first shim 90 and a second shim 92. In other words, the longitudinal arrangements of LEDs are substantially parallel to second wall 56 and/or to third wall 58. The LEDs emit warm white light with a color rendering index equal to 85, a temperature of 4,000 Kelvins, an intensity of 550 Lumens (per lighting element), and a diffusion angle of 30°.

In order for the light-emitting source thus defined not to overexpose the upper portion of face 72 of the user when photographs are taken, it comprises an optical cache 94. The optical cache may also protect photographic apparatus 62 so that it is not directly dazzled by lighting elements 85 and 86. The optical cache may possibly also avoid a direct illumination of the background of the booth by said light-emitting source to avoid an inhomogeneous illumination of said background and to maximize the saturation of the background color.

A fourth wall 60 closes the booth and forms said background.

Optical cache 94 comprises a first opening 96 and a second opening 98 enabling the first and the second lighting elements to illuminate at least a portion of the second and third walls. A transparent wall 100 covers each opening 96, 98 to protect the lighting elements from the outer environment. Advantageously, such transparent walls may be equipped with an antireflection treatment on the lighting element side to maximize the illumination of walls 56 and 58.

More specifically, according to a preferred embodiment of the invention, the angles of shims 90 and 92 are selected so that the lighting elements illuminate areas of the second and third walls located at the same height in the booth as the surface delimited by the intersection between the field of view and the focal plane of the photographic apparatus. The first and the second shims incline with respect to ceiling 84 of the booth, respectively by 26.5° and by 28°, the first and the second lighting elements. The optimization of these angles depends on the distance between the user (reference position 74) and walls 56 and 58, as well as on the distance between the user and the height of light source 82, and on the center-to-center distance of the two lighting elements 85 and 86.

Thus, the light emitted by light-emitting source 82 is reflected on said areas, then forming a first diffusing light-emitting surface 102 on second wall 56, and a second diffusing light-emitting surface 104 positioned in front and on the sides of face 72 of the user.

Advantageously, light-emitting surfaces 102 and 104 illuminate all the portions of the faces of user 70, according to a large number of incident directions. Thereby, the dark or bright areas formed by the first and/or the second light-emitting devices, are illuminated by the emitting surfaces so that the face is homogeneously illuminated.

FIG. 2B illustrates the advantages of the invention, with a photographic portrait taken by the machine illustrated in FIGS. 3 and 4. A substantially homogeneous illumination of the user's face in FIG. 2B can also be observed with respect to FIG. 2A, despite an approximate positioning of his/her face with respect to the reference position of the installation. The invention thus enables to limit the contrast of a photographic portrait, by allowing a homogeneous illumination of the user, even if he/she is not accurately positioned according to the reference position. Due to the invention, photographs of better quality are then obtained, whatever the position, the user's size, the inclination and the morphology of his/her face.

Another advantage of the invention also is to be able to decrease the intensity of the light emitted by the first and second emission devices, the emitting surfaces compensating for such an intensity decrease. The dazzling of the user by light-emitting source 82 is then less significant, thus providing a better comfort of use of the installation by the user.

According to an alternative embodiment of the above-described installation, the fourth wall 60 shown in FIG. 3 may be at least partially transparent, to enable another emission device 106 arranged behind said wall to illuminate the inside of the booth. The fourth emission device comprises an array network of LEDs 108 of different colors, for example, blue, red, and green, enabling to illuminate the background of the booth according to a plurality of colors. The LEDs may be similar to those described hereabove.

A surface of the fourth wall may also be covered with a dark antireflection (or mat) layer, for example black, which is also semi-transparent. This surface of the fourth wall can then absorb part of the light originating from the inside of the booth, to allow a saturation and a homogeneity of the background of the booth by the fourth emission device.

As a conclusion, the present application provides a novel type of photographic portrait acquisition installation allowing a homogenous illumination of a user's face, when he/she poses in an approximate way with respect to a reference position of said booth. The obtained photographic portraits thus have a good quality, whatever the morphology and the positioning of the user's face at the level of the reference position of said installation. It is then possible to illuminate the background of the booth with different saturated color backgrounds while limiting the effects of colored reflections on the obtained portraits.

The invention claimed is:

1. A photographic portrait acquisition installation formed of a booth delimiting an inner space, comprising:
    a first wall delimiting a portion of the inner space of the booth, at least a portion of the first wall being transparent;
    a device comprising a photographic apparatus or camera arranged behind a transparent or semi-transparent portion of the first wall, said device comprising a field of view directed toward the inside of the booth and having its focal plane located inside of the booth;
    at least one light-emitting device arranged behind a transparent portion of the first wall, capable of illuminating the inside of the booth;
    wherein the photographic portrait acquisition installation further comprises an additional light-emitting device, comprising at least two light-emitting surfaces, illuminating the inside of the booth and respectively arranged on a second wall and a third wall parallel with and facing each other and delimiting the inner space of the booth, wherein the light-emitting surfaces are arranged to the left and to the right of the photographic apparatus, between the first wall and the focal plane of the photographic apparatus, and outside of the field of view of the device;
    wherein the booth comprises a first area delimited by the field of view of the photographic apparatus and its focal plane, and a second area excluding the first area; and
    wherein the additional light-emitting device comprises a first and a second reflective surfaces, respectively arranged on the second and the third walls in the second area, a light source capable of illuminating the first and the second reflective surfaces, the light source being arranged between the first and the third walls, and an optical cache arranged so that the light source only illuminates the second area of the booth.

2. The portrait acquisition installation of claim 1, wherein a surface of the optical cache opposite the light-emitting source is reflective.

3. The portrait acquisition installation of claim 1, wherein the additional light-emitting device comprises an optical cache arranged between the light source and each wall supporting the reflective surfaces, to limit the value of the angle of dispersion of the light illuminating said walls to a value smaller than 90 degrees.

4. The portrait acquisition installation of claim 1, wherein the light source comprises two lighting elements, the lighting elements respectively illuminating the second and the third walls of the booth.

5. The portrait acquisition installation of claim 4, wherein each lighting element has an elongated shape and comprises an axis of larger dimension, said axis being substantially parallel to the second and/or the third walls of the booth.

6. The portrait acquisition installation of claim 1, further comprising:
    a fourth wall delimiting the inner space of the booth, at least partly transparent, the fourth wall being located opposite the first wall; and
    an additional light-emitting device capable of illuminating the inside of the booth and arranged behind the fourth wall.

7. The portrait acquisition installation of claim 6, wherein the fourth wall comprises an antireflection layer to avoid reflecting the light originating from the inside of the booth, a layer absorbing the light originating from the inside of the booth, or a diffusion layer of the additional light-emitting device.

8. The portrait acquisition installation of claim 1, further comprising means enabling to control the light intensity and/ or the color of at least one of said light-emitting devices.

* * * * *